Figure 1:
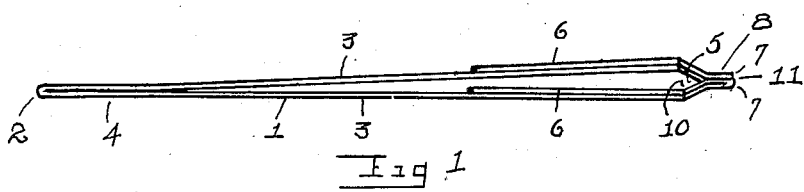

Sept. 20, 1949.  J. A. FIRSCHING  2,482,407
PILE AND KNIFE GUIDE FOR PILE CUTTING MACHINES
Filed Oct. 17, 1945

Inventor
Joseph A. Firsching
By Thomas L. Wilder
Attorney

Patented Sept. 20, 1949

2,482,407

UNITED STATES PATENT OFFICE 2,482,407

PILE AND KNIFE GUIDE FOR PILE CUTTING MACHINES

Joseph A. Firsching, Utica, N. Y.

Application October 17, 1945, Serial No. 622,869

4 Claims. (Cl. 26—8)

My invention relates to a pile and knife guide for pile cutting machines and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a guide to the pile in cutting pile fabrics especially those in making corduroy. Heretofore, the guides have been made of three pieces of metal wire having their joints soldered together. An additional piece of solder was used to separate the side members of the guide for the admittance of the knife, usually circular in formation. This arrangement was objectional for the reason that the guide broke easily and especially at the joints where solder was used.

The present invention is designed to overcome the objectional features of the old guide by making the guide in one piece and spot welding the joints, whereby to lend strength to the guide and to make the joints strong, durable and lasting.

Figure 2:
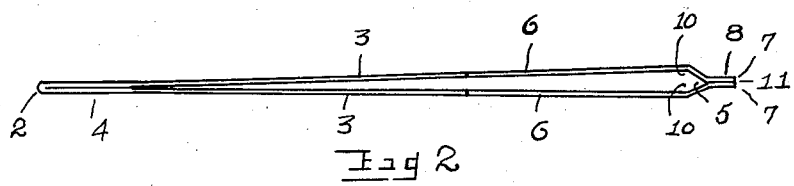
Figure 3:
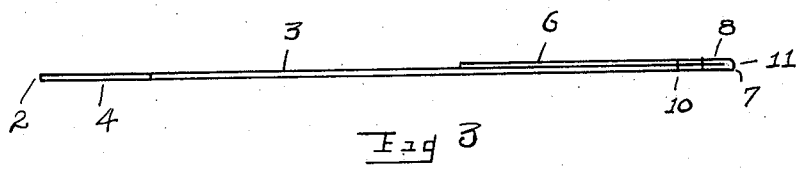

The object will be understood by referring to the drawings in which:

Fig. 1 is a perspective view of the device.
Fig. 2 is a plan view of the device.
Fig. 3 is a side elevation of the device.

Referring more particularly to the drawings, the guide embodies a single piece of wire 1, folded double at 2 to form two diverging side members 3, 3, of the guide. The folded end 2 is spot welded for a short distance thereof, as at 4, where the side members 3, 3 run parallel to each other for a short distance before branching outwardly into a V shape for the admittance of the circular knife, not shown, used in cutting the piles of the fabric.

Likewise, the free ends 6, 6 of wire 1 are also doubled back upon themselves at 7, 7, whereby to form two parallel overlapping layers of wire 1 on each of the sides 3, 3 for substantially half of their lengths. This formation will provide a double thickness of wire 1 at the locations where strength is needed and will aid also in directing the knife in cutting the piles of the corduroy or other fabric.

The means for separating the sides 3, 3 of wire 1 into a wedge shaped structure contemplates the arching or turning inward towards each other of sides 3, 3 at a suitable angle as at 10, 10 and then bringing the sides 3, 3 together at 5 and running them parallel to each other at 8 for a short distance, then doubling the sides 3, 3 back in layer formation to the extreme ends of 6, 6. The overlaying portions of wire 1 are spot welded to each other. Furthermore, parallel portions at 8 of the respective ends are brought together and spot welded to form a closed joint at 11.

The V shaped formation of the guide allows for the admittance of the circular knife for cutting piles of the corduroy fabric, as above stated. The spot welding of the parallel layers and joints at 4 and 11 will effect a permanent union that will withstand a much greater strain than soldering as heretofore.

Having thus described my invention what I claim as new and desire to secure by Letters Patent is as follows:

1. In a pile and knife guide for pile cutting machines, a member made of a single piece of wire, said wire being folded double and spot welded in a portion thereof and branching outwardly from the folded part to form a V shaped opening for the admittance of a circular knife, the branch portions of said wire turning inwards towards each other and coming together in parallel relation and then doubled back each upon itself, whereby to form members for strengthening said guide.

2. In a pile and knife guide for pile cutting machines, a member made of a single piece of wire, said wire being bent double upon itself, said doubled portions running parallel a short distance, and then branching outwardly into two arms to form a V shaped opening for the admittance of a circular knife, said two branching arms then turning towards each other and meeting to form parallel members, and the free ends of said wire being bent back upon themselves to aid in strengthening said guide.

3. In a pile and knife guide for pile cutting machines, a member made of one piece of wire, said member being bent double and having portions in parallel relation to each other, said double portion being spot welded, other portions of said wire branching outwardly to provide a V shaped opening therebetween for the admission a circular knife, other portions of said wire bent to close said V shaped opening, and the free ends of said wire bent back upon themselves to provide supports to said guide.

4. In a pile and knife guide for pile cutting machines, a member made of a single piece of wire, said wire being bent double, portions being extended in parallel relation to each other and spot welded to hold said parts rigidly together, portions branching outwardly from said parallel portions at an angle to each other to form a V shaped opening therebetween for the admission of a circular knife, said branching portions of said wire bent at another angle inward, whereby said branching portions meet and extend in parallel relation to each other, the free ends of said wire being bent back upon themselves, whereby to extend along and above said branching portions and for about one half the length thereof to aid in strengthening said guide and said parallel portions of said wire being spot welded to effect a permanent union to aid in withstanding strain thereon.

JOSEPH A. FIRSCHING.

REFERENCES CITED

The following references are of record in the file of this patent:

UNITED STATES PATENTS

| Number | Name | Date |
|---|---|---|
| 1,684,113 | Robinson | Sept. 11, 1928 |

FOREIGN PATENTS

| Number | Country | Date |
|---|---|---|
| 3,453 | Great Britain | 1877 |
| 15,739 | Great Britain | 1901 |